United States Patent
Nuernberger (10) Patent No.: US 12,468,270 B2
(45) Date of Patent: Nov. 11, 2025

(54) ARRANGEMENT AND METHOD FOR TRAINING A MACHINE LEARNING MODEL FOR STATE DETERMINATION

(71) Applicant: Infineon Technologies AG, Neubiberg (DE)

(72) Inventor: Kajetan Nuernberger, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 448 days.

(21) Appl. No.: 18/060,587

(22) Filed: Dec. 1, 2022

(65) Prior Publication Data

US 2024/0184253 A1 Jun. 6, 2024

(51) Int. Cl.
*G05B 13/02* (2006.01)

(52) U.S. Cl.
CPC .. *G05B 13/027* (2013.01); *G05B 2219/25257* (2013.01)

(58) Field of Classification Search
CPC ............. G05B 13/027; G05B 2219/25257
See application file for complete search history.

(56) References Cited

U.S. PATENT DOCUMENTS

| | | | |
|---|---|---|---|
| 2010/0152878 A1* | 6/2010 | Chu ........... | G05B 17/02 700/110 |
| 2015/0230108 A1* | 8/2015 | Sridhara ....... | G06F 21/552 455/26.1 |
| 2022/0268475 A1* | 8/2022 | Barnes ......... | G06N 20/10 |

OTHER PUBLICATIONS

Arm Limited, "Cortex-M3, Revision r2p0, Technical Reference Manual", Section 10.1, dated Feb. 26, 2010, 133 pages, ARM DDI 0337H (ID032710).

* cited by examiner

*Primary Examiner* — Gary Collins
(74) *Attorney, Agent, or Firm* — VIERING, JENTSCHURA & PARTNER mbB

(57) ABSTRACT

According to various embodiments, a training arrangement for training a machine learning model for state determination in closed-loop control is described, comprising a microcontroller and a data processing system external to the microcontroller. The microcontroller comprises a trace system configured to capture operational information state information determined by a machine learning model of the microcontroller and to transmit them to the data processing system which is configured to compare the determined state information with ground truth sensor information, to determine whether an update for the machine learning model is required depending on the comparison and, if it has determined that an update for the machine learning model is required, to determine an update for the machine learning model and transmit the update to the microcontroller. The microcontroller is configured to update the machine learning model in response to the reception of an update from the data processing system.

20 Claims, 4 Drawing Sheets

ARRANGEMENT AND METHOD FOR TRAINING A MACHINE LEARNING MODEL FOR STATE DETERMINATION

TECHNICAL FIELD

Exemplary implementations described herein generally relate to devices and methods for training arrangements for training a machine learning model for state determination.

BACKGROUND

A machine learning model such as neural network may in particular be used to determine state information of a controlled system from observed operational information about the controlled system which may then be used to control the controlled system. As in every application of machine learning models, such a machine learning model needs to be trained for the task it should perform. However, when the machine learning model is implemented on a microcontroller which performs the controlling, training the machine learning model is not trivial since a microcontroller may not have the resources to perform the training and external training of the machine learning model in iterations of training the model, deploying the model on the microcontroller and re-training the model using observed data is inefficient and error prone.

Therefore, efficient approaches for training a machine learning model for state determination in closed-loop control are desirable.

SUMMARY

According to various embodiments, a training arrangement for training a machine learning model for state determination is provided, including a microcontroller and a data processing system external to the microcontroller. The microcontroller is configured to receive operational information about a plant and feed the operational information to a machine learning model implemented on the microcontroller and configured to determine state information about the plant from the operational information and is configured to control the plant using the determined state information. The microcontroller includes a trace system configured to capture the operational information and the determined state information and to transmit the captured operational information and the determined state information to the data processing system. The data processing system is configured to receive the operational information and the determined state information, to compare the determined state information with ground truth sensor information about the state of the plant, to determine whether an update for the machine learning model is required depending on the comparison and, if it has determined that an update for the machine learning model is required, to determine an update for the machine learning model and transmit the update to the microcontroller. The microcontroller is configured to update the machine learning model in response to the reception of an update from the data processing system.

The machine learning module may be for state determination in closed loop control.

According to a further embodiment, a method for training a machine learning model for state determination in control according to the above training arrangement is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EXEMPLARY IMPLEMENTATIONS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
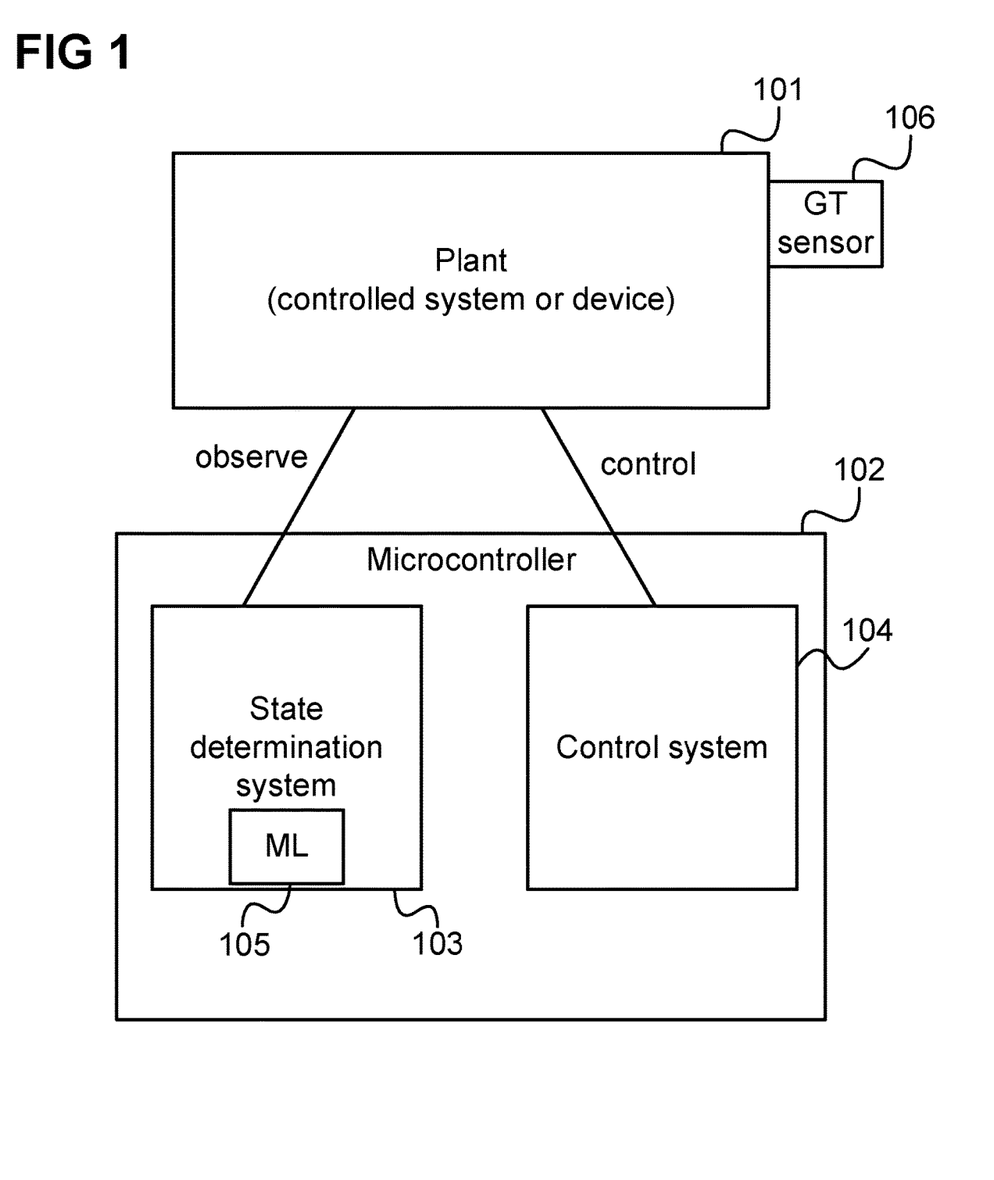
FIG. 1 shows a control arrangement.

FIG. 1 shows a control arrangement 100.

A plant 101 (in the sense of control theory, i.e. a controlled system or controlled device) such as a motor is controlled by a microcontroller 102. The microcontroller 102 observes the plant 101 (i.e. receives operational information about the plant 101) and implements a state determination system 103 configured to determine a state of the plant 101 (i.e. state information about the plant) from the operational information. The microcontroller 102 further implements a control system 104 which receives the state information and controls the plant 101 accordingly (to compensate for a difference between the determined state and a desired state).

In the example of the plant being a motor, the operational information is for example a rotor current from which the state determination system 103 determines a rotor position and the control system 104 for example increases a supply voltage of the motor such that the position catches up with a desired position (i.e. to compensate a difference between a desired motor speed and the current motor speed). The state determination system 103 may also determine the current motor speed from a sequence of rotor current samples.

The control system 104 may be a classical controller such as a proportional integral differential, PID, controller.

The state determination system 103 may for example use a machine learning model 105 such as a neural network which is configured to determine state information about the plant 101 from the operational information. For this, the machine learning model 105 needs to be trained. This may be done on a separate device like a personal computer or server computer provided for training by exporting data (containing pairs of operational information and associated ground truth state information which is measured by an additional means like a (ground truth) sensor 106, e.g. a position sensor in the above example). When the machine learning model 105 has been trained, it may be deployed on the microcontroller 102 to implement the state determination system 103. However, multiple iterations of such a training process may be required, e.g. when an operational range in which the plant is operated changes or in case it turns out that the machine learning model performs too poorly in a certain operational range with regard to control. Further, there may be effects of interference between the machine learning model and the control algorithm used by the control system or the plant which may impact the control performance but can only observed after deployment of the machine learning model. Therefore, there is a high likelihood that the training process must be repeated several times, i.e. several training iterations need to be performed until a good result is achieved.

Thus, the training process is time consuming as each iteration consists out of multiple steps:
Data Capture & Data Storing
Retraining of the machine learning model
Tuning the network for the target platform (microcontroller)
build a new version of the whole target software (software for microcontroller)
deploy new version of the target software on the microcontroller
evaluate the new version of the target software Moreover, the fact that multiple steps are involved increases the risks of errors happening during one or more of these steps, for example taking up old captured data for training.

As an alternative to the training process described above, which may be seen as offline training process since a machine learning model is trained and then deployed, an online training approach may be used where a training agent is implemented on the microcontroller which adjusts the machine learning model (e.g. to maximize (or at least increase)) a reward that is the higher the better state information determined by the machine learning model fits state information determined by another means (e.g. a sensor, which may however not be able to deliver state information sufficient for control on its own, e.g. its sampling rate may be too low, it may not be usable under all conditions or it may not be desirable to use it on a long-term basis).

However, the implementation of a training agent costs hardware resources (computational power and memory) on the microcontroller 104. Furthermore, the implementation of the training agent may, e.g. for implementing reinforcement learning, require specific hardware and/or a specific instruction set. Further, disabling the training agent may impact the execution time of the microcontroller's software (in particular the control software) which might have an impact on the system behavior.

In view of the above, according to various embodiments, a training agent for an online training is implemented on an external data processing system (i.e. external with respect to the microcontroller).

Figure 2:
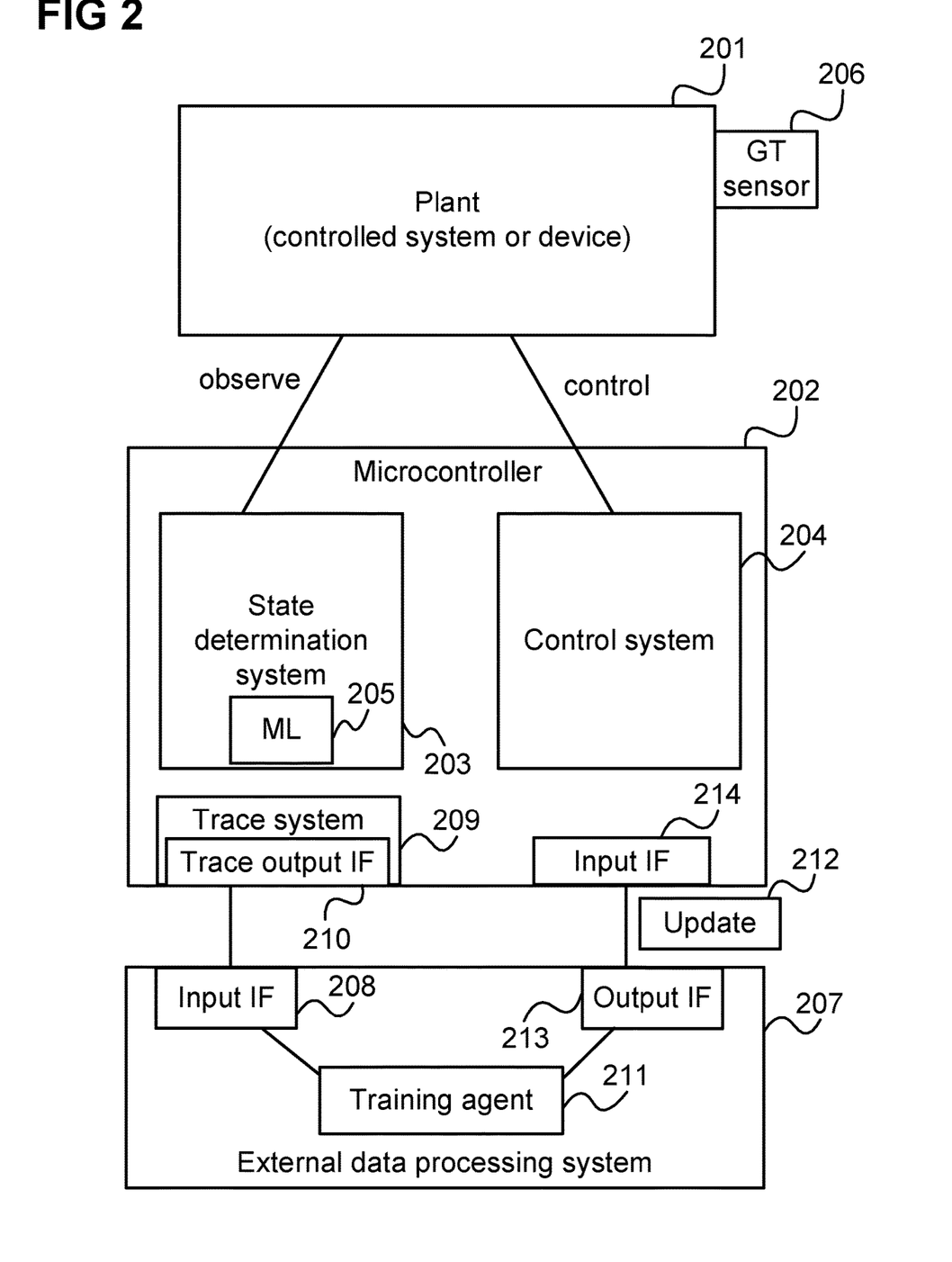
FIG. 2 shows a control and training arrangement according to an embodiment.

FIG. 2 shows a control and training arrangement 200 according to an embodiment.

Similarly to the control arrangement 100 of FIG. 1, the control and training arrangement 200 includes a plant 201 and a microcontroller 202 implementing a state determination system 203 (including a machine learning model 205) and a control system 204.

In addition to the training arrangement 100 of FIG. 1, the control and training arrangement 200 further includes an external (with respect to the microcontroller 202) data processing system 207. The external data processing system 205 includes an input interface 208 for receiving the operational information about the plant 201 acquired by the microcontroller 202 and the state information the machine learning model 205 determines from the operational information. This information is provided by a trace system 209 of the microcontroller 202 including a trace output interface 210 and is used by a training agent 211 implemented by the external data processing system 205.

The training agent 211 determines whether the machine learning model 205 determines state information from operational information with sufficient accuracy and generates and update 212 for the machine learning model 205 if the accuracy is not sufficient (e.g. if the (e.g. averaged or summed) difference to a ground truth lies over a threshold). In that case, the data processing system 202 transmits the update 212 via an output interface 213 to the microcontroller 202 which receives it by a corresponding input interface 214 and updates the machine learning model 205 accordingly.

A trace system, i.e. hardware trace support, is a feature available in many microcontrollers targeting real time domain. Trace can be used to gather program execution information but tracing can also be applied to data reads and writes. Further, a (hardware) trace system typically provides filters to limit the trace data to a reasonable bandwidth.

The data transmitted by the trace system 208 to the external data processing system 207 may include multiple data elements, each including operational information and associated state information determined by the machine learning model, such that the training agent 211 may calculate a loss (or a reward) for batches of data elements (by summing or averaging over losses or rewards of individual data elements. The reward or loss for a data element is calculated using a ground truth (e.g. a measured rotor position) which may also be collected by the microcontroller 202 (e.g. from a ground truth sensor 206 provided at the plant) and transmitted to the external data processing system 206 via the trace system 209 or may also be transmitted from the ground truth sensor 106 to the data processing system 207 via another path (i.e. communication interface).

In other words, the complete operational information may be in the form of multiple operational information elements, each associated with a state information element including the state information determined from the operational information contained in the respective operational information element.

So, according to various embodiments a pre-trained neural network 205 is loaded into the memory of the microcontroller 202. The executable code for implementing the neural network 205 may be loaded into directly available read only memory of the microcontroller 202 and weights, biases and any parameters of the neural network 205 are loaded into RAM of the microcontroller 202 accessible by memory access. The executable code may for example be run in a parallel processing unit (PPU) of the microcontroller 202 to make the necessary neural network calculations.

The microcontroller 202 obtains observation data from the plant 201 and feeds it to the PPU which carries out the calculations based on the observation data, weights, biases and parameters. The trace functionality provided by the microcontroller (e.g. having a system-on-chip (SOC) infrastructure) around the core in the PPU is used together with a corresponding filter to extract the input and output data fed to and from the core to the neural network 205. This trace data which is captured without interfering with the running of the core is then fed to the external training agent 211 via the trace output interface 210.

This data is then monitored by the external training agent 211 which observes the inputs and outputs of the neural network 205 and checks the latter for expected results (i.e. compares the state information output by the neural network with ground truth state information). In the case that the deviations between the state information output by the neural network with ground truth state information are too high then the external training agent 211 determines new weights, biases and parameters which give a better fit (i.e. less deviation). The data processing system 207 makes these new weights etc. available for the microcontroller 202 (i.e. transmits them to the microcontroller) which uses them to update the weights, biases and parameters. This training process can be run iteratively, with continued monitoring and updating as required.

Figure 3:
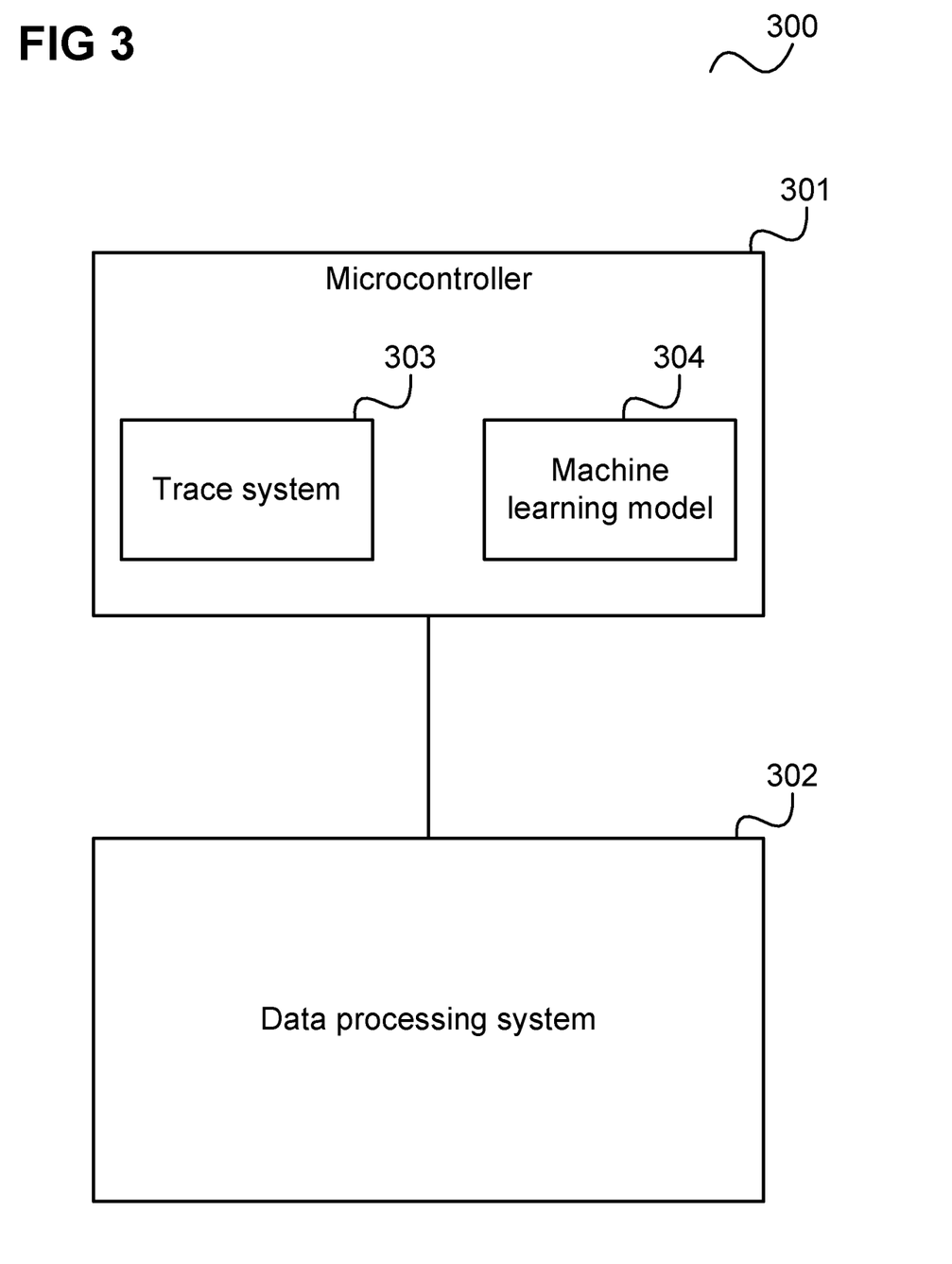
FIG. 3 shows a training arrangement for training a machine learning model for state determination in closed-loop control according to an embodiment.

In summary, according to various embodiments, a training arrangement is provided as illustrated in FIG. 3.

FIG. 3 shows a training arrangement 300 for training a machine learning model for state determination in closed-loop control according to an embodiment.

The training arrangement 300 includes a microcontroller 301 and a data processing system 302 external to the microcontroller 301.

The microcontroller 301 (e.g. by means of one or more processors it includes) is configured to receive operational information about a plant feed the operational information to a machine learning model 303 implemented on the microcontroller (i.e. stored in a memory of the microcontroller for execution by the one or more processors) and configured to determine state information about the plant from the operational information; and control the plant using the determined state information.

The microcontroller 301 includes a trace system 304 configured to capture the operational information and the determined state information and to transmit the captured operational information and the determined state information to the data processing system 302.

The data processing system 302 is configured to receive the operational information and the determined state information, to compare the determined state information with ground truth sensor information about the state of the plant, to determine whether an update for the machine learning model 303 is required (according to a predetermined criterion, e.g. a threshold for a loss) depending on the comparison and, if it has determined that an update for the machine learning model 303 is required, to determine an update for the machine learning model 303 and transmit the update to the microcontroller 301.

The microcontroller 301 is configured to update the machine learning model in response to the reception of an update from the data processing system 302.

If the data processing system 302 determines that no update is necessary, it can leave the machine learning model unchanged and wait for new operational information and determined state information and repeat the process (i.e. determine again whether an update is required based on the new information and generate an update if required).

According to various embodiments, a training agent for a machine learning model running on a microcontroller for determining state information from operational information is provided externally to the microcontroller. Thus, instead of applying a training agent directly on the embedded target (i.e. the microcontroller) the training agent is run in parallel on a separate hardware (training agent on external data processing system).

In comparison to an online training approach using a training agent running on the microcontroller, the approach of FIG. 3 does not require additional computational resources on the (e.g. embedded) microcontroller to implement the training agent. It should be noted that a trace system (i.e. trace infrastructure) is typically present on microcontrollers for real time operation. Furthermore, porting of the training agent (e.g. special reinforcement algorithms) to target microcontroller architecture is not required. Additionally, tracing is a non-intrusive mechanism so it has no impact on the timing of the operation (in particular software execution) of the microcontroller. Therefore, the microcontroller's operational timing does not depend on whether learning is currently active (in particular data capture is performed, i.e. operational information and determined state information is forwarded to the data processing system) or not.

Thus, in contrast to a training approach using an external training agent (i.e. non-target side training agent) based on a dedicated communication interface (rather than using the trace system), the approach of FIG. 3 allows avoiding differences of the operational timing of the microcontroller between the training phase (including the data capture for the external data processing system) and the field deployment phase (not including data capture for the external data processing system) since trace is non-intrusive and can be configured independent of the target software.

Moreover, providing the data via a dedicated interface to an external training agent typically requires computational effort, memory and software porting (also if less in comparison to a training agent on the target).

The trace system provides high bandwidth non-intrusive interface to transfer the necessary data from the microcontroller to the external training agent. Trace does not require an additional interface as it is typically anyway provided for other development activities. In contrast, an external training agent with a dedicated interface would require such an additional interface which may increase hardware cost of the microcontroller. Furthermore, interfaces are potential security risks especially those only dedicated for development. For a trace and debug interface there is typically anyway a mechanism provided to properly deactivate it. For a dedicated interface to an external training learning agent a separate mechanism would need to be applied.

The approach of FIG. 3 can be seen to provide a (quasi) closed loop coupled training system with a fast adaption without requiring a high number of training process steps (export data, deployment . . . ).

The external training agent (i.e. the training agent implemented on the external processing device which determines whether an update is required and determines the update for the machine learning model if required) does not need to run with hard real-time requirements. As long as it is possible to capture all necessary data (i.e. the trace data including the operational information and the determined state information) and apply a training algorithm with a small delay it is sufficient. As the training does not directly impact the target microcontroller also jitter in the calculation time is acceptable. This means a normal PC (personal computer) with a device to capture the trace data may be sufficient. Once the machine learning model has been improved by a certain bound on the external training agent the update (e.g. new weights) are deployed to the microcontroller. Afterwards immediately the behavior of the updated machine learning model can be observed and further trained in case this is needed.

Figure 4:
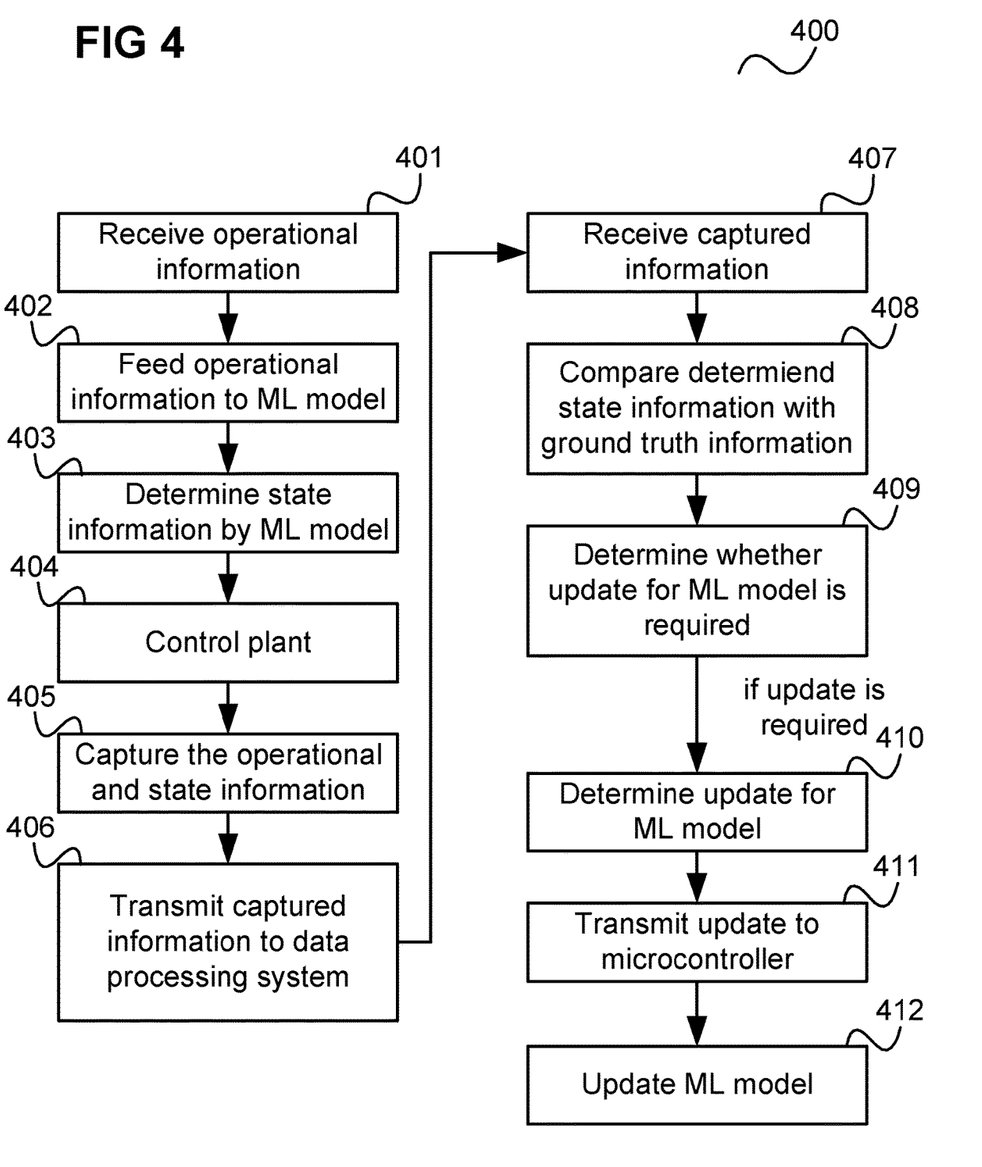
FIG. 4 shows a flow diagram illustrating a method for training a machine learning model for state determination in closed-loop control.

According to various examples a method as illustrated in FIG. 4 is performed.

FIG. 4 shows a flow diagram 400 illustrating a method for training a machine learning model for state determination in closed-loop control.

In 401 a microcontroller receives, operational information about a plant.

In 402 the microcontroller feeds the operational information to a machine learning model implemented on the microcontroller.

In 403 the machine learning model determines state information about the plant from the operational information.

In 404 the microcontroller controls the plant using the determined state information.

In 405 a trace system of the microcontroller captures the operational information and the determined state information.

In 406 the trace system transmits the captured operational information and the determined state information to a data processing system external to the microcontroller.

In 407 the data processing system receives the operational information and the determined state information.

In 408 the data processing system compares the determined state information with ground truth sensor information about the state of the plant.

In 409 the data processing system determines, whether an update for the machine learning model is required depending on the comparison and, if it is determined that an update for the machine learning model is required, determines in 410 an update for the machine learning model and transmits the update to the microcontroller in 411.

In 412 the microcontroller updates, the machine learning model in response to the reception of an update from the data processing system.

It should be noted that the steps indicated in FIG. 4 do not necessarily have to be carried out in that order but may be combined and/or reordered. In particular, because the trace system is non-intrusive, the operations 406 to 411 do not necessarily need to be in sequential order to the rest. Further, multiple time steps may be aggregated. For example, in order to reduce the communication overhead the operation 406 might first gather several samples (of operational and state information) and transmit them in one package.

The controller controlling (or being configured to control) the plant using the determined state information may be a control in the sense of closed-loop control but may for example also mean that it takes into account an anomaly detection result generated by the machine learning model, e.g. stop the plant or put it in the safe state in case the machine learning model indicates, by the state information it generates, that there is an anomaly.

The data processing system may be implemented by one or more processors. A "processor" may be understood as any kind of a logic implementing entity, which may be special purpose circuitry or a processor executing software stored in a memory, firmware, or any combination thereof. Thus a "processor" may be a hard-wired logic processor or a programmable logic processor such as a programmable processor, e.g. a microprocessor. A "processor" may also be a processor executing software, e.g. any kind of computer program. Any other kind of implementation of the respective functions which are described herein in more detail may also be understood as a "processor".

The following examples pertain to further exemplary implementations.

Example 1 is a training arrangement as described above with reference to FIG. 3.

Example 2 is the training arrangement of example 1, wherein the operational information about the plant comprises sensor information.

Example 3 is the training arrangement of example 1 or 2, comprising a sensor monitoring the plant configured to provide the ground truth sensor information.

Example 4 is the training arrangement of any one of examples 1 to 3, wherein the microcontroller is configured to collect the ground truth sensor information and to provide the ground truth sensor information to the data processing system.

Example 5 is the training arrangement of any one of examples 1 to 4, wherein the data processing system is configured to compare a loss between the determined state information and the ground truth sensor information and to determine that an update for the machine learning model is required if the determined loss is above a predetermined threshold.

Example 6 is the training arrangement of any one of examples 1 to 5, wherein the data processing system is configured to, for each operational information element of a plurality of operational information elements of the operational information and state information element comprising the state information determined by the machine learning model from the operational information of the operational information element, determine a loss and to determine an overall loss for the plurality of operational information elements by summing or averaging the determined losses and to determine that an update for the machine learning model is required if the determined overall loss is above a predetermined threshold.

Example 7 is the training arrangement of any one of examples 1 to 6, wherein the machine learning model is a neural network and the update comprises updates for weights of the neural network.

Example 8 is the training arrangement of any one of examples 1 to 7, wherein the microcontroller comprises one or more processors running software implementing the machine learning model and a control algorithm for controlling the plant using the determined state information.

Example 9 is the training arrangement of any one of examples 1 to 8, wherein the microcontroller has a system on chip architecture including the trace system.

Example 10 is the training arrangement of any one of examples 1 to 9, wherein the trace system is configured to capture the operational information and the determined state information from data processed and generated by a processor of the microcontroller.

Example 11 is the training arrangement of example 10, wherein the trace system comprises a filter configured to extract the operational information and the determined state information from the data processed and generated by the processor of the microcontroller.

Example 12 is the training arrangement of example 10 or 11, wherein the processor is a parallel processing unit of the microcontroller.

Example 13 is a method for training a machine learning model for state determination as described above with reference to FIG. 4.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

REFERENCE SIGNS

100 control arrangement
101 plant 102 microcontroller
103 state determination system
104 control system
105 machine learning model
106 sensor
200 control and training arrangement
201 plant
202 microcontroller
203 state determination system
204 control system
205 machine learning model
206 sensor
207 external data processing system
208 data processing system input interface
209 trace system
210 trace output interface
211 training agent
212 update
213 data processing system output interface
214 microcontroller input interface
300 training arrangement
301 microcontroller
302 data processing system
303 machine learning model
304 trace system
400 flow diagram
401-412 processing

The invention claimed is:

1. A training arrangement for training a machine learning model for state determination in control, comprising a microcontroller and a data processing system external to the microcontroller, wherein the microcontroller:
   is configured to receive operational information about a plant and feed the operational information to a machine learning model implemented on the microcontroller and configured to determine plant state information about the plant from the operational information; and
   is configured to control the plant using the plant state information; and
   wherein the microcontroller comprises a hardware trace system and a corresponding filter configured to capture microcontroller trace information corresponding to input and output data between a core of the microcontroller and the machine learning model associated with the operational information and the plant state information and to transmit the captured microcontroller trace information to the data processing system without interfering with normal operation of the of the core; and
   wherein the data processing system is configured to receive the operational information, the microcontroller trace information, and the plant state information, to compare the plant state information with ground truth sensor information about the state of the plant, to determine whether an update for the machine learning model is required depending on a comparison of the microcontroller trace information and the ground truth sensor information, if it has determined that an update for the machine learning model is required, to determine a learning model update for the machine learning model and transmit the learning model update to the microcontroller; and
   wherein the microcontroller is configured to update the machine learning model in response to reception of the learning model update from the data processing system.

2. The training arrangement of claim 1, wherein the operational information about the plant comprises sensor information.

3. The training arrangement of claim 1, comprising a sensor monitoring the plant configured to provide the ground truth sensor information.

4. The training arrangement of claim 1, wherein the microcontroller is configured to collect the ground truth sensor information and to provide the ground truth sensor information to the data processing system.

5. The training arrangement of claim 1, wherein the data processing system is configured to compare a loss between the plant state information and the ground truth sensor information and to determine that the learning model update for the machine learning model is required if the determined loss is above a predetermined threshold.

6. The training arrangement of claim 1, wherein the data processing system is configured to, for each operational information element of a plurality of operational information elements of the operational information and state information element comprising the state information determined by the machine learning model from the operational information of the operational information element, determine a loss and to determine an overall loss for the plurality of operational information elements by summing or averaging the determined losses and to determine that an update for the machine learning model is required if the determined overall loss is above a predetermined threshold.

7. The training arrangement of claim 1, wherein the machine learning model is a neural network and the update comprises updates for weights of the neural network.

8. The training arrangement of claim 1, wherein the microcontroller comprises one or more processors running software implementing the machine learning model and a control algorithm for controlling the plant using the plant state information.

9. The training arrangement of claim 1, wherein the microcontroller has a system on chip architecture including the hardware trace system.

10. The training arrangement of claim 1, wherein a parallel processing unit of the microcontroller executes the machine learning model.

11. A method for training a machine learning model for state determination, comprising:
   receiving, by a microcontroller, operational information about a plant;
   feeding, by the microcontroller, the operational information to a machine learning model implemented on the microcontroller;
   determining, by the machine learning model, plant state information about the plant from the operational information;
   controlling, by the microcontroller, the plant using the plant state information;
   capturing, by a hardware trace system of the microcontroller and in connection with a corresponding filter, microcontroller trace information corresponding to input and output data between a core of the microcontroller and the machine learning model associated with the operational information and the plant state information;
   transmitting, by the hardware trace system, the microcontroller trace information to a data processing system external to the microcontroller without interfering with normal operation of the of the core;
   receiving, by the data processing system, the operational information, the microcontroller trace information, and the plant state information;

comparing, by the data processing system, the plant state information with ground truth sensor information about the state of the plant to form a first comparison;

comparing, by the data processing system, the microcontroller trace information with ground truth sensor information about the state of the plant to form a second comparison;

determining, by the data processing system, whether a learning model update for the machine learning model is required depending on the first comparison and the second comparison and, if it is determined that an update for the machine learning model is required, determining, by the data processing system, the learning model update for the machine learning model and transmitting the learning model update to the microcontroller; and updating, by the microcontroller, the machine learning model in response to reception of the learning model update from the data processing system.

12. The method of claim 11, wherein the operational information about the plant comprises sensor information.

13. The method of claim 11, comprising a sensor monitoring the plant configured to provide the ground truth sensor information.

14. The method of claim 11, wherein the machine learning model is a neural network and the learning model update comprises updates for weights of the neural network.

15. The method of claim 11, wherein the data processing system is configured to, for each operational information element of a plurality of operational information elements of the operational information and state information element comprising the state information determined by the machine learning model from the operational information of the operational information element, determine a loss and to determine an overall loss for the plurality of operational information elements by summing or averaging the determined losses and to determine that an update for the machine learning model is required if the determined overall loss is above a predetermined threshold.

16. The method of claim 11, wherein the data processing system is configured to compare a loss between the plant state information and the ground truth sensor information and to determine that an update for the machine learning model is required if the determined loss is above a predetermined threshold.

17. The method of claim 11, wherein the machine learning model is a neural network and the update comprises updates for weights of the neural network.

18. The method of claim 11, wherein the microcontroller comprises one or more processors running software implementing the machine learning model and a control algorithm for controlling the plant using the plant state information.

19. The method of claim 11, wherein the microcontroller has a system on chip architecture including the hardware trace system.

20. The method of claim 11, wherein a parallel processing unit of the microcontroller executes the machine learning model.

* * * * *